United States Patent [19]

Yamada

[11] Patent Number: 5,220,264

[45] Date of Patent: Jun. 15, 1993

[54] CONTROL SYSTEM FOR AN AC SERVOMOTOR HAVING A PERMANENT MAGNET TYPE

[75] Inventor: Eiji Yamada, Toyota, Japan

[73] Assignee: Toyota Jidosha Kabushiki Kaisha, Aichi, Japan

[21] Appl. No.: 740,895

[22] Filed: Aug. 6, 1991

[30] Foreign Application Priority Data

Aug. 24, 1990 [JP] Japan ................. 2-221270

[51] Int. Cl.$^5$ ............................................. G05B 11/28
[52] U.S. Cl. ................................. 378/599; 318/609;
 318/717; 318/721; 318/811
[58] Field of Search ............... 318/811, 807-810,
 318/715-717, 719, 721, 722, 723, 599, 600,
 606-609, 798-811

[56] References Cited

U.S. PATENT DOCUMENTS

| | | |
|---|---|---|
| 3,840,799 | 10/1974 | Macko et al. ...................... 318/722 |
| 4,511,834 | 4/1985 | Studtmann ......................... 318/200 |
| 4,629,958 | 12/1986 | Kurakake et al. .................. 318/723 |
| 5,012,169 | 4/1991 | Ono et al. ...................... 318/631 X |
| 5,023,924 | 6/1991 | Tajima et al. ..................... 388/811 |

*Primary Examiner*—William M. Shoop, Jr.
*Assistant Examiner*—David Martin
*Attorney, Agent, or Firm*—Finnegan, Henderson, Farabow, Garrett & Dunner

[57] ABSTRACT

In an AC servomotor control system consisting of an inverter for controlling a rotational speed and an output torque of an AC servomotor, a converter for controlling a DC voltage at a connecting point between an inverter and a converter, and a controller, the DC voltage is controlled at a constant voltage when the rotational speed is under a rated speed $\omega_b$, and controlled as an increasing voltage in proportion to the rotational speed when it is over the rated speed $\omega_b$ so that the output torque of the servomotor is maintained at a constant torque.

14 Claims, 5 Drawing Sheets

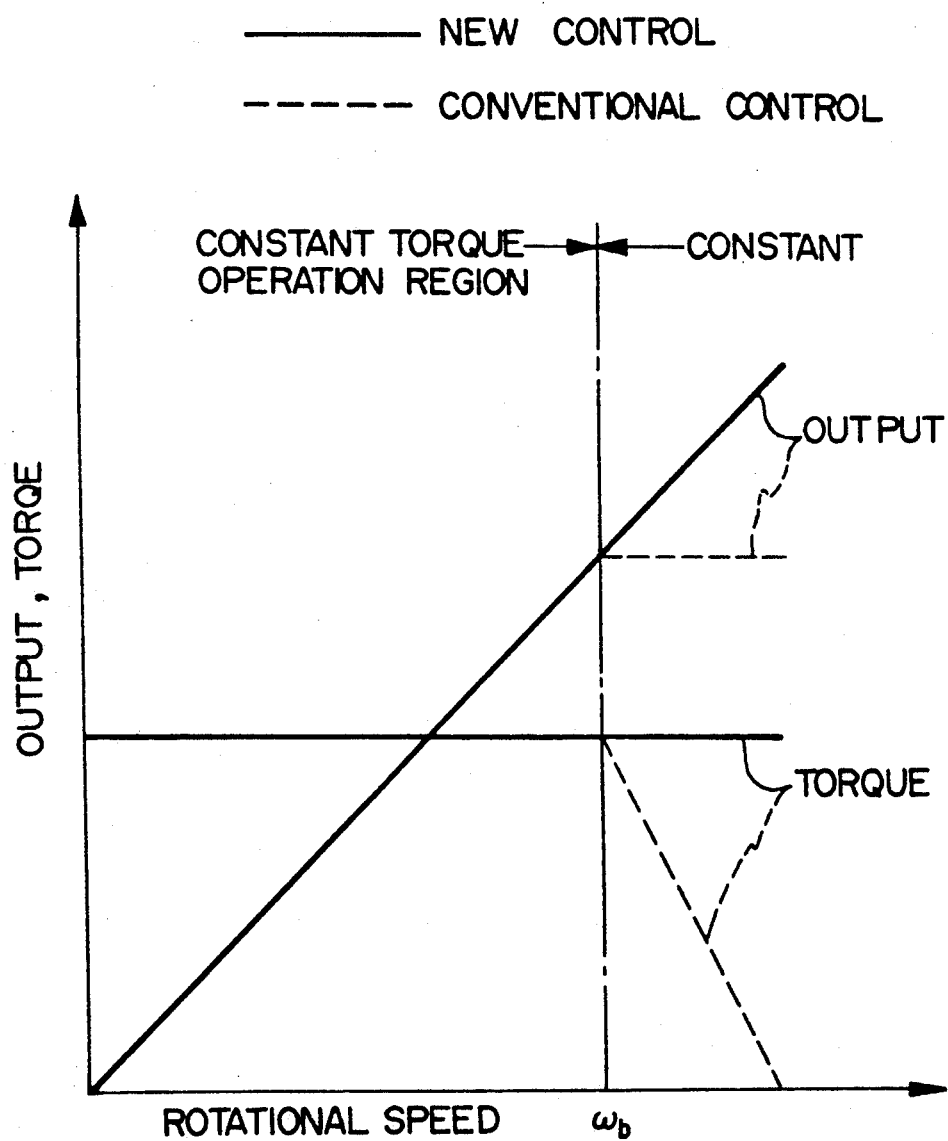

CONTROL SYSTEM FOR AN AC SERVOMOTOR HAVING A PERMANENT MAGNET TYPE

BACKGROUND OF THE INVENTION

1. Field of the Invention

The present invention relates to a control system in an AC servomotor having a permanent magnet type rotor, and more particularly, to a control system enabling a high-torque operation at a high speed by controlling a DC voltage at a connecting point between a converter and an inverter.

2. Description of the Related Art

Servomotors are widely used in various kinds of numerical control (NC) machine tools, working robots, or the like, to position the tables of the NC machine tools, and the attitudes of the working robots.

Currently, an AC servomotor with a permanent magnet type rotor is mainly used, because the maintenance thereof is easy due to the use of electronic switches such as power transistors, and the absence of mechanical commutators and brushes.

To operate an AC servomotor at a required speed and a required torque, it is well known to control an ON-OFF period of transistor switches with a pulse wide modulation (hereinafter referred to as PWM) (see Japanese Unexamined Utility Model Application (Kokai) 57-135892).

In this control system, AC power is rectified by the converter having diodes which consist of a three-phase bridge circuit. The rectified DC power is again inverted by the inverter with transistor switches which also consist of a three-phase bridge circuit, to supply an AC power to the AC servomotor, and the transistor switches are controlled in accordance with the switching pattern determined by the PWM, based on a target speed and torque.

In this control system, however, the converter generally consists of diodes, and DC voltage at the output terminal of the converter is unconditionally determined by the inter-phase AC voltage at the input of the inverter. Therefore, the AC output voltage at the output of the inverter, which is applied to the AC servomotor, cannot be controlled beyond the voltage determined by the inter-phase AC voltage at the input of the inverter. Accordingly, the output torque is lowered when the AC servomotor is operated over the basic speed (hereinafter referred to as $\omega_b$)

FIG. 5 shows a characteristic of a typical AC servomotor with a permanent magnet rotor, wherein the dotted line shows the characteristic when the AC servomotor is operated by a conventional control method. This characteristic shows that the AC servomotor is operated at a constant torque under $\omega_b$, but does not maintain a constant torque over $\omega_b$.

SUMMARY OF THE INVENTION

Therefore, an object of the present invention is to provide a servomotor control system able to maintain a constant torque over the basic speed $\omega_b$.

According to this invention, in a servomotor control system, the DC voltage at a connecting point between the converter and the inverter is controlled by controlling the inverter with PWM to maintain a constant torque when the AC servomotor is operated over $\omega_b$.

BRIEF DESCRIPTION OF THE DRAWINGS

The present invention will be more clearly understood from the description set forth below with reference to the accompanying drawings.

DESCRIPTION OF THE PREFERRED EMBODIMENTS

Figure 1:
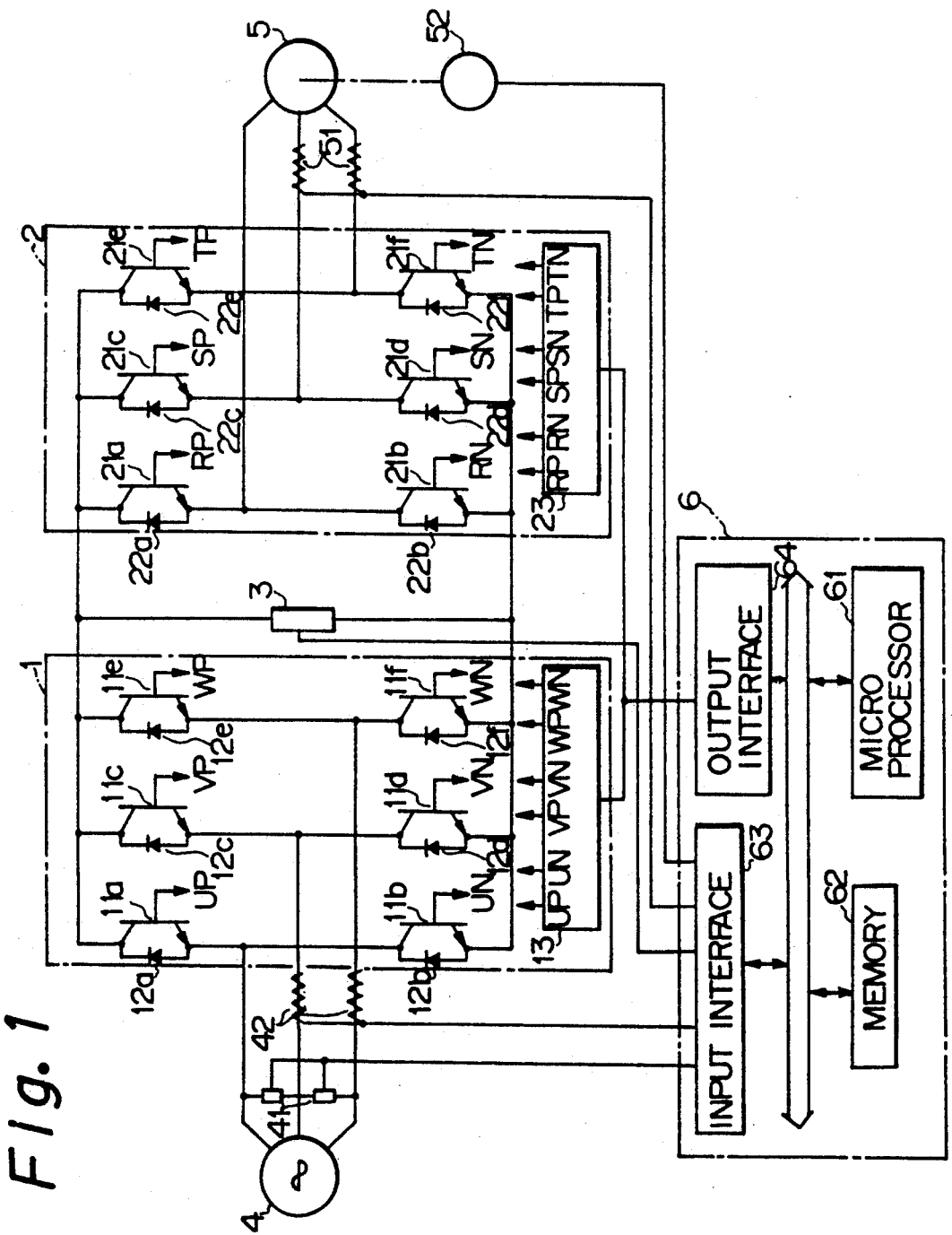
FIG. 1 is a circuit diagram of the AC servomotor control system according to the present invention.

In FIG. 1, which illustrates an AC servomotor control system according to the present invention, reference numeral 1 designates a converter which rectifies a three phase AC input power to a DC power, wherein the converter consists of a three-phase bridge circuit with 6 pairs of switching transistors 11a, 11b ... 11f and feedback diodes 12a, 12b ... 12f, which are arranged, respectively, in parallel, and the gate of each of the switching transistors 11a, 11b ... 11f is connected to the converter gate controller 13.

The converter rectifies AC power supplied from an AC power source 4 to a DC power having a required voltage, and the DC voltage is controlled by the converter gate controller 13 so that the DC voltage conforms to a target DC voltage applied to the converter gate controller 13.

Reference numeral 2 designates an inverter which inverts a DC power to an AC power, wherein the inverter consists of a three-phase bridge circuit with 6 pairs of switching transistors 21a, 21b ... 21f and feedback diodes 22a, 22b ... 22f which are arranged respectively, in parallel, and the gate of each of the switching transistors 21a, 21b ... 21f is connected to the inverter gate controller 23.

The inverter inverts the DC power, i.e., the output of the converter, to an AC power having the required frequency and required voltage, and the AC frequency and the AC voltage are controlled by the inverter gate controller 23 so that the AC frequency and the AC voltage conform to a target AC frequency and a target AC voltage applied to the inverter gate controller 23.

A DC voltage measuring device 3 for measuring the DC voltage is provided at a set of connecting points between the converter and the inverter.

An AC phase measuring device 41 for measuring the phase-difference of input AC power and an AC input current measuring device 42 for measuring the current of input AC power are provided between the AC power source 4 and the converter 1.

An AC current measuring device 51 for measuring the current of AC output power, which drives the AC servomotor 5, is provided between the inverter 2 and the AC servomotor 5, and a rotary encoder 52 directly connected to the shaft of the AC servomotor 5 is provided to detect the rotational angle of the AC servomotor 5.

A controller 6 is also provided to control the converter gate controller 13 and the inverter gate controller 23, based on the measured values obtained by the above-mentioned various kinds of measuring devices.

The controller 6 consists of a microprocessor 61, a memory 62, an input interface 63, an output interface 64, and a bus 65 which connects these elements.

The measured values obtained from the DC voltage measuring device 3, the AC phase-difference measuring device 41, the AC input current measuring device 42, the AC current measuring device 51, and the rotary encoder 52 are fetched in the microprocessor 61 through the input interface 63, and calculated values are sent from the microprocessor 61 to the converter gate controller 13 and the inverter gate controller 23, through the output interface 64.

Figure 2:
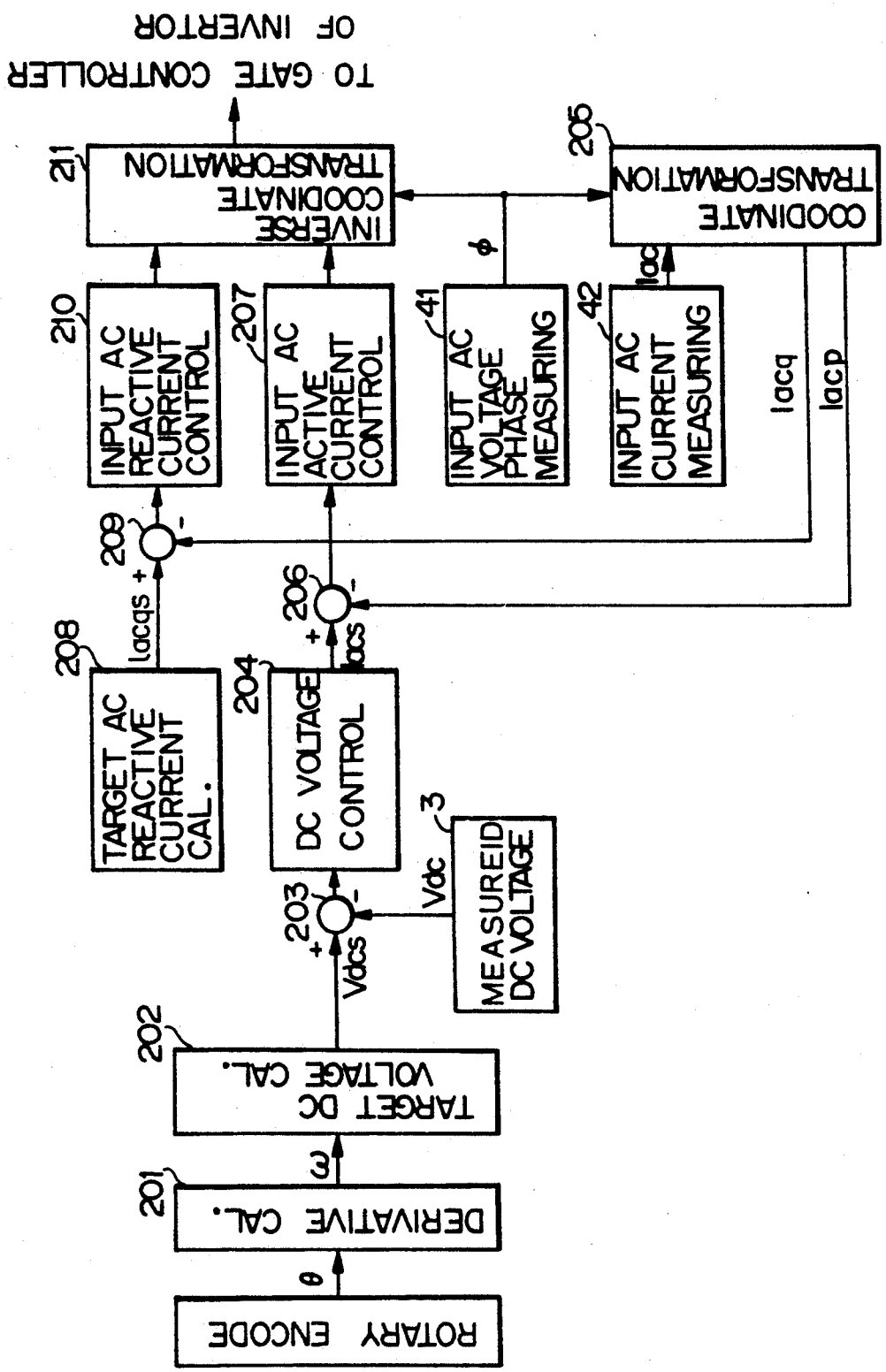
FIG. 2 is a functional diagram of the AC servomotor control system according to the present invention.

FIG. 2 is a functional diagram for explaining the control function according to the present invention, wherein the control calculation is executed based on the control program stored in the memory 62.

The rotational angle $\theta$ of the AC servomotor 5 detected by the rotary encoder 52, which is directly connected to the shaft of the AC servomotor, is derived at the differential calculation part 201, and the rotational speed $\omega$ is obtained.

A target DC voltage Vdcs required to obtain a desired output torque is determined as the function of the rotational speed $\omega$ at the target DC voltage calculation part 202.

At the first comparing part 203, the DC voltage Vdc measured by the DC voltage measuring device 3 is compared with the target DC voltage Vdcs, and the output of the first comparing part 203, i.e., the deviation of Vdc from Vdcs, is sent to the DC voltage controller 204, wherein a well-known PI calculation is applied, and the target input AC current Iacs is output.

The input AC current Iac measured by the input AC current measuring device 42 is divided into an active current Iacp and a reactive current Iacq, based on the phase difference measured by the AC phase measuring device 41 at the coordinate transforming part 205.

The active current Iacp is compared with the above-mentioned target input AC current Iacs at the second comparing part 206, and its output, i.e., the deviation of Iacp from Iacs, is sent to the input AC active current controller 207, wherein a well-known PI calculation is applied.

Further, the reactive current Iacq is compared with the target reactive current Iacqs determined at the target reactive current calculating part 208 at the third comparing part 209, and its output, i.e., the deviation of Iacq from Iacqs, is sent to the input AC reactive current controller 210, wherein a well-known PI calculation is applied. Note, the target reactive current Iacqs is generally set as "0", and thus the power factor of the input AC power becomes "1".

The outputs from the input AC active current controller 207 and the input AC reactive current controller 210 are sent to the inverse coordinate transforming part 211, and compose the command signal for the converter gate controller 13 of the converter 1 based on the phase difference measured by the AC phase measuring device 41.

Figure 3:
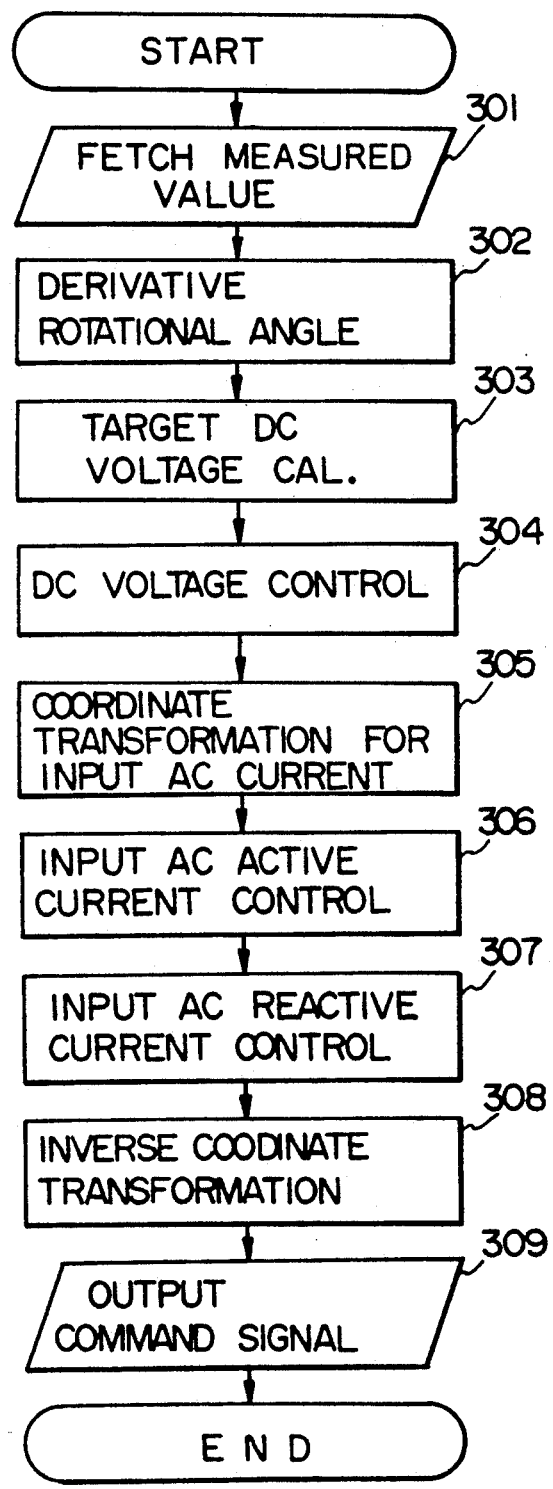
FIG. 3 is a flow chart showing the operation of the control system.

FIG. 3 is the flow chart of the control routine, which is executed at predetermined intervals.

At step 301, the following values, which are required for the execution of this routine, are fetched into the microprocessor 61.

(1) The rotational angle $\theta$ of the AC servomotor 5 detected by the rotary encoder 52.

(2) The DC voltage Vdc measured by the DC voltage measuring device 3.

(3) The input AC current Iac measured by the input AC current measuring device 42.

(4) The phase difference $\phi$ measured by the AC phase measuring device 41.

At step 302, the rotational speed $\omega$ of the AC servomotor is calculated by a differential calculation for the rotational angle $\theta$, and the target DC voltage Vdcs is determined according to the rotational speed $\omega$ at step 303.

Figure 4:
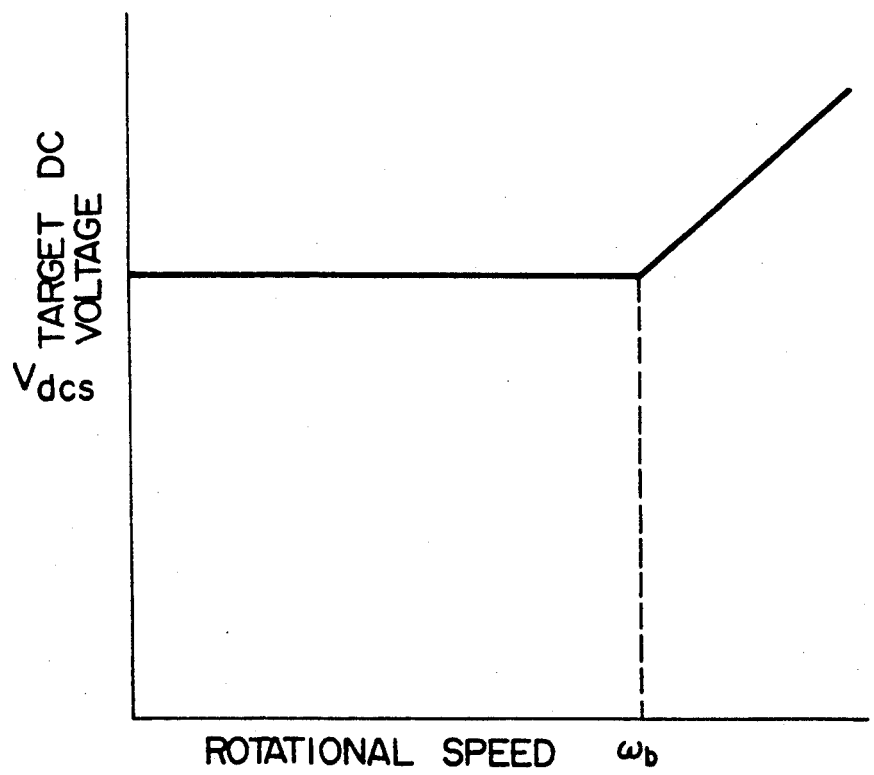
FIG. 4 is a graph showing the relationship between a rotational speed and a target DC voltage; and, FIG. 5 is a graph showing the characteristic of an AC servomotor.

FIG. 4 is one example showing the relationship between the rotational speed $\omega$ and the target DC voltage Vdcs. In this graph, the abscissa shows the rotational speed $\omega$, and the ordinate shows the target DC voltage. Note, the target DC voltage Vdcs is determined as a constant when the rotational speed $\omega$ of the AC servomotor is under $\omega_b$ and as a value which is increasing in proportion to $\omega$ when $\omega$ is over $\omega_b$.

At step 304, the target input AC current Iacs is determined based on Vdcs and Vdc, and at step 305, the target input AC current Iacs is divided into the active current Iacp and the reactive current Iacq, by a coordinate transforming, in accordance with the phase difference $\theta$.

At step 306 and 307, the active input AC current control and the reactive input AC current control are performed, and at step 308, the results of these two controls are composed by an inverse coordinate transforming, and then at step 309, the command signal to the inverter 1 is output.

Note, the converter gate controller 13, for example, consists of a gate array, and controls the switching transistors 11a, 11b ... 11f in accordance with the command signal.

The inverter 2 inverts the Dc power to AC power having a voltage and frequency determined by the required torque and speed of the AC servomotor by, for example, using PWM.

According to the present invention, the operation of the AC servomotor can be maintained at the required torque even when the rotational speed is over the basic speed $\omega_b$, as shown by the solid line of FIG. 5.

What is claimed is:

1. A method of controlling a rotational speed and an output torque of an AC servomotor with a permanent magnet-type rotor using a converter for rectifying an input AC power to a DC power, an inverter for inverting said DC power to an output AC power, an inverter controller for controlling a speed and an output torque with inverter switching elements installed in said inverter, and a converter controller for controlling a DC voltage of said DC power with converter switching elements installed in said converter, the method comprising the steps of:

detecting an actual rotational speed of said AC servomotor;

determining a target DC voltage as a constant voltage that gives a constant output torque for said AC servomotor when said actual rotational speed is under a rated speed determined from a characteristic of said AC servomotor, and as an increasing voltage in proportion to said actual rotational speed when said actual rotational speed is over said rated speed;

calculating a target AC current in accordance with said target DC voltage and a measured DC voltage of said DC power; and adjusting a converter control signal for said converter controller in accordance with said target AC current and a measured input AC current.

2. The method as set forth in claim 1, wherein said step of detecting an actual rotational speed of said AC servomotor comprises the steps of:
   detecting an actual rotational angle of said AC servomotor; and
   calculating a derivative in time of said actual rotational angle of said AC servomotor.

3. The method as set forth in claim 1, wherein said step of calculating a target AC current comprises the steps of:
   calculating a DC voltage difference between said target DC voltage and a measured DC voltage of said DC power; and
   performing a PI operation on said DC voltage difference to output a target AC current.

4. The method as set forth in claim 1, wherein said step of adjusting a converter control signal for said converter comprises the steps of:
   dividing a measured input AC current into an active AC current and a reactive AC current;
   controlling said active AC current in accordance with said target AC current to output controlled active AC current;
   controlling said reactive AC current to output a controlled reactive AC current; and
   composing said controlled active AC current and said controlled reactive AC current into a converter control signal for said converter based upon a phase angle of said input AC power.

5. The method as set forth in claim 4, wherein said step of controlling said active AC current comprises the steps of:
   calculating an active difference between said target input AC current and said active AC current; and
   performing a PI operation on said active AC difference to output said controlled active AC current.

6. The method as set forth in claim 4, wherein said step of controlling said reactive AC current comprises the steps of:
   setting a target reactive AC current;
   calculating a reactive AC difference between said target reactive AC current and said reactive AC current; and
   performing a PI operation on said reactive AC difference to output said controlled active AC current.

7. The method as set forth in claim 6, wherein said step of setting a target reactive AC current comprises the step of:
   setting "0" as said target reactive AC current.

8. An apparatus for controlling a rotational speed and an output torque of an AC servomotor with a permanent magnet-type rotor using a convertor for rectifying an input AC power to a DC power, an inverter for inverting said DC power to an output AC power, an inverter controller for controlling a speed and an output torque with inverter switching elements installed in said inverter, and a converter controller for controlling a DC voltage of said DC power with converter switching elements installed in said converter, said apparatus comprising:
   means for detecting an actual rotational speed of said AC servomotor;

means for determining a target DC voltage as a constant voltage that gives a constant output torque for said AC servomotor when said actual rotational speed is under a rated speed determined from a characteristic of said AC servomotor, and as an increasing voltage in proportion to said actual rotational speed when said actual rotational speed is over said rated speed;
   means for calculating a target AC current in accordance with said target DC voltage and a measured DC voltage of said DC power; and
   means for adjusting a converter control signal for said converter controller in accordance with said target AC current and a measured input AC current.

9. The apparatus as set forth in claim 8, wherein said means for detecting an actual rotational speed of said AC servomotor comprises:
   means for detecting an actual rotational angle of said AC servomotor; and
   means for calculating a derivative in time of said actual rotational angle of said AC servomotor.

10. The apparatus as set forth in claim 8, wherein said means for calculating a target AC current comprises:
    means for calculating a DC voltage difference between said target DC voltage and a measured DC voltage of said DC power; and
    means for performing a PI operation on said DC voltage difference to output a target AC current.

11. The apparatus as set forth in claim 8, wherein said means for adjusting a converter control signal for said converter comprises:
    means for dividing a measured input AC current into an active AC current and a reactive AC current;
    means for controlling said active AC current in accordance with said target AC current to output controlled active AC current;
    means for controlling said reactive AC current to output a controlled reactive AC current; and
    means for composing said controlled active AC current and said controlled reactive AC current into a converter control signal for said converter based upon a phase angle of said input AC power.

12. The apparatus as set forth in claim 11, wherein said means for controlling said active AC current comprises:
    means for calculating an active difference between said target input AC current and said active AC current; and
    means for performing a PI operation on said active AC difference to output said controlled active AC current.

13. The apparatus as set forth in claim 11, wherein said means for controlling said reactive AC current comprises:
    means for setting a target reactive AC current;
    means for calculating a target reactive AC difference between said target reactive AC current and said reactive AC current; and
    means for performing a PI operation on said reactive AC difference to output said controlled active AC current.

14. The apparatus as set forth in claim 13, wherein said means for setting a target reactive AC current comprises:
    means for setting "0" as said target reactive AC current.

* * * * *